(12) United States Patent
Takahashi

(10) Patent No.: US 12,100,993 B1
(45) Date of Patent: Sep. 24, 2024

(54) OUTER ROTOR BRUSHLESS MOTOR

(71) Applicant: MABUCHI MOTOR CO., LTD., Chiba (JP)

(72) Inventor: Takuya Takahashi, Chiba (JP)

(73) Assignee: MABUCHI MOTOR CO., LTD., Chiba (JP)

(*) Notice: Subject to any disclaimer, the term of this patent is extended or adjusted under 35 U.S.C. 154(b) by 0 days.

(21) Appl. No.: 18/574,315

(22) PCT Filed: May 30, 2023

(86) PCT No.: PCT/JP2023/020147
§ 371 (c)(1),
(2) Date: Dec. 27, 2023

(51) Int. Cl.
| | | |
|---|---|---|
| H02K 1/18 | (2006.01) | |
| H02K 1/2786 | (2022.01) | |
| H02K 3/34 | (2006.01) | |
| H02K 3/52 | (2006.01) | |
| H02K 21/22 | (2006.01) | |

(52) U.S. Cl.
CPC ............ *H02K 1/187* (2013.01); *H02K 1/18* (2013.01); *H02K 1/2786* (2013.01); *H02K 3/345* (2013.01); *H02K 3/522* (2013.01); *H02K 21/22* (2013.01); *H02K 2203/12* (2013.01)

(58) Field of Classification Search
CPC .... H02K 3/522; H02K 21/22; H02K 2203/12; H02K 1/2786; H02K 1/18; H02K 1/187; H02K 1/14; H02K 3/50; H02K 5/225; H02K 3/345
USPC ............................ 310/216.105, 71, 214, 215
See application file for complete search history.

(56) References Cited

U.S. PATENT DOCUMENTS

| | | | |
|---|---|---|---|
| 2015/0130332 A1 | 5/2015 | Sakai et al. | |
| 2017/0187273 A1* | 6/2017 | Fukuhara | ............ H02K 15/022 |
| 2019/0312476 A1* | 10/2019 | Murakami | ............ H02K 23/34 |

FOREIGN PATENT DOCUMENTS

| | | |
|---|---|---|
| CN | 104638840 A | 5/2015 |
| CN | 107528401 A | 12/2017 |
| CN | 107528413 A | 12/2017 |

(Continued)

OTHER PUBLICATIONS

Suwazono Shoko, Outer Rotor Type Motor, Aug. 9, 2012, JP 2012151947 (English Machine Translation) (Year: 2012).*

(Continued)

*Primary Examiner* — Alexander A Singh
(74) *Attorney, Agent, or Firm* — HAUPTMAN HAM, LLP

(57) ABSTRACT

A motor includes a rotor configured to rotate integrally with a shaft; a stator placed radially outward of the shaft and radially inward of the rotor; and a tubular bushing that is fixed to one end side of the stator and through which the shaft is inserted. The stator includes: a stator core having a tube portion through which the shaft is inserted, and a plurality of tooth portions protruding radially outward from the tube portion; a plurality of coils formed by winding a winding around each of the plurality of tooth portions; and an insulating layer formed by applying an insulating coating to the tooth portions around which the winding is wound. The bushing includes: a fixed portion to be fixed to an inner peripheral surface of the tube portion; and a guide portion that extends axially outward of an end surface of the stator core from the fixed portion and with which a crossover wire (Wc) connecting between the plurality of coils comes into contact.

8 Claims, 3 Drawing Sheets

(56) References Cited

FOREIGN PATENT DOCUMENTS

| | | | |
|---|---|---|---|
| CN | 109586431 | A | 4/2019 |
| CN | 217904111 | U | 11/2022 |
| JP | 2003-309942 | A | 10/2003 |
| JP | 2007-181372 | A | 7/2007 |
| JP | 2012151947 | A * | 8/2012 |
| JP | 2017-229111 | A | 12/2017 |
| JP | 2019-068593 | A | 4/2019 |
| JP | 2022-156256 | A | 10/2022 |

OTHER PUBLICATIONS

International Search Report in PCT/JP2023/020147, mailed Jul. 11, 2023, 2pp.
Written Opinion in PCT/JP2023/020147, mailed Jul. 11, 2023, 9pp.
Office Action in CN Application No. 202380012441.0, dated Apr. 19, 2024, 13pp.
Office Action in CN Application No. 202380012441.0 dated Jul. 19, 2024, 11pp.

* cited by examiner

OUTER ROTOR BRUSHLESS MOTOR

RELATED APPLICATIONS

The present application is a National Phase of International Application Number PCT/JP2023/020147, filed May 30, 2023.

TECHNICAL FIELD

The present invention relates to an outer rotor brushless motor including a rotor that rotates integrally with a shaft and a stator placed radially inward of the rotor.

BACKGROUND ART

An outer rotor motor is known which has a structure that prevents contact between a crossover wire of a stator and a component (for example, a shaft) radially inward of the stator. The crossover wire is a part of a winding that connects between a plurality of coils formed by winding the winding around a stator core of the stator. For example, a motor of Patent Literature 1 discloses a stator including a plurality of salient pole portions placed radially from an annular base, and an inner peripheral wall standing axially on an inner peripheral portion of the base. In the motor, a crossover wire that connects coils provided respectively to the salient pole portions is routed along an outer peripheral surface of the inner peripheral wall. Consequently, the crossover wire is prevented from making its way radially inward of the base.

CITATION LIST

Patent Literature

Patent Literature 1: JP-A-2007-181372

DISCLOSURE OF THE INVENTION

Problems to be Solved by the Invention

Portions of the stator of Patent Literature 1, excluding surfaces, which face the rotor, of the salient pole portions and an inner peripheral surface of the base, are covered with a resin insulator. In the stator of Patent Literature 1, such an insulator is provided to achieve insulation between the base and the salient pole portions, and the coils. However, a gap (also called a slot) between adjacent salient pole portions is reduced by the thickness of the insulator. Consequently, the volume of the slot (the area of the cross section in the axial direction) is reduced, and it may become difficult to secure a sufficient space for forming the coil. In other words, the known outer rotor brushless motor has room for improvement in securing a sufficient space for forming a coil in the stator while achieving a structure that prevents contact between the crossover wire and the shaft.

The outer rotor brushless motor of the present invention has been devised in view of such a problem, and one of objects thereof is to prevent interference between a crossover wire and a shaft while securing a sufficient space for forming a coil in a stator core. Note that the present invention is not limited to this object, and another object of the present invention is to exert operations and effects that are derived from configurations presented in DESCRIPTION OF PREFERRED EMBODIMENTS described below and cannot be obtained by the known technology.

Solutions to the Problems

An outer rotor brushless motor of the disclosure can be achieved as aspects (application examples) disclosed below, and solves at least a part of the above problem. Any of Aspect 2 and subsequent aspects is an aspect that can be additionally selected as appropriate, and is an aspect that can be omitted. Any of Aspect 2 and the subsequent aspects does not disclose an aspect and configuration that are essential to the present invention.

Aspect 1. An outer rotor brushless motor of the disclosure includes: a rotor configured to rotate integrally with a shaft: a stator placed radially outward of the shaft and radially inward of the rotor; and a tubular bushing that is fixed to one end side of the stator and through which the shaft is inserted. The stator includes: a stator core having a tube portion through which the shaft is inserted, and a plurality of tooth portions protruding radially outward from the tube portion: a plurality of coils formed by winding a winding around each of the plurality of tooth portions: and an insulating layer formed by applying an insulating coating to the tooth portions around which the winding is wound. The bushing includes: a fixed portion to be fixed to an inner peripheral surface of the tube portion: and a guide portion that extends axially outward of an end surface of the stator core from the fixed portion and with which a crossover wire connecting between the plurality of coils comes into contact.

Aspect 2. In the above aspect 1, it is preferable that the bushing have a stepped shape in which an outer surface, which faces radially outward, of the guide portion is located radially outward of the inner peripheral surface.

Aspect 3. In the above aspect 2, it is preferable that the inner peripheral surface be provided with a positioning groove extending axially. In this case, it is preferable that the guide portion be provided, on a bushing end surface facing in the same direction as the end surface, with a recessed portion of a recessed shape.

Aspect 4. In any of the above aspects 1 to 3, it is preferable that the fixed portion include: a cylindrical base portion having an outer peripheral surface with an outer diameter at which the base portion is fittable from the inside to the inner peripheral surface; and a protruding portion protruding from the outer peripheral surface, and is press-fitted and fixed to the inner peripheral surface.

Aspect 5. In the above aspect 4, it is preferable that the fixed portion include three or more protruding portions. In this case, it is preferable that the three or more protruding portions be provided, spaced apart from one another in a circumferential direction.

Aspect 6. In any of the above aspects 1 to 5, it is preferable that the stator core include six tooth portions.

Effects of the Invention

According to an outer rotor brushless motor of the present disclosure, it is possible to prevent interference between a crossover wire and a shaft while securing a space for forming a coil in a stator core.

DESCRIPTION OF PREFERRED EMBODIMENTS

Figure 1:
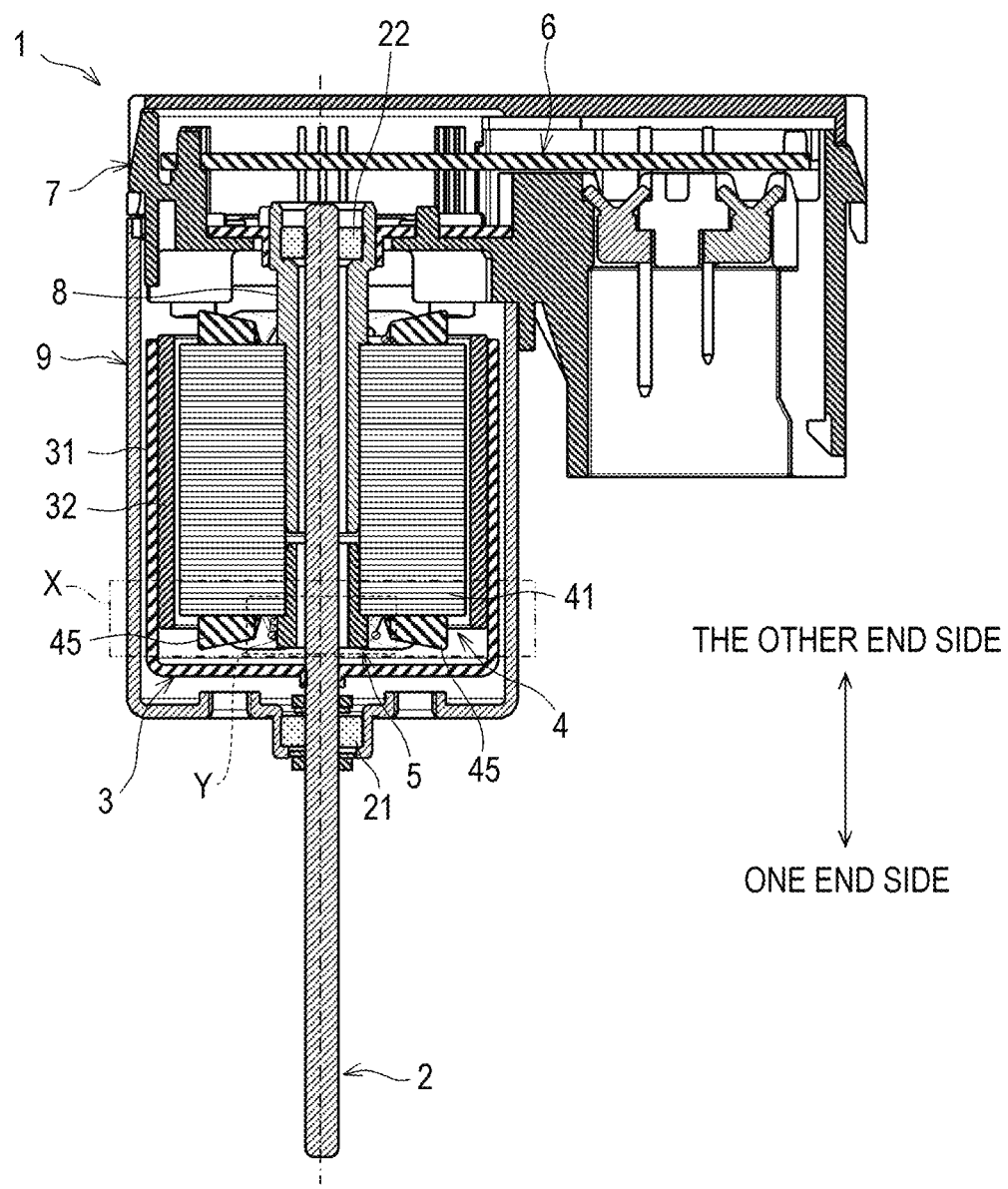
FIG. 1 is an axial cross-sectional view of an outer rotor brushless motor according to an embodiment.

An outer rotor brushless motor as an embodiment is described with reference to the drawings. The embodiment illustrated below is a mere example, and is not intended to preclude various modifications and application of a technology, which are not explicitly stated in the following embodiment. Configurations of the embodiment can be modified in various manners within the scope that does not depart from the purport of the configurations, and can be carried out. Moreover, a selection can be made from the configurations as needed, or the configurations can be combined as appropriate.

The outer rotor brushless motor (hereinafter simply referred to as the "motor") includes a rotor that rotates integrally with a shaft, and a stator placed radially outward of the shaft and radially inward of the rotor. In the motor of the embodiment, instead of an insulator provided to a known motor, a stator core of the stator is covered with an insulating coating to form an insulating layer. As a result, one of features of the motor of the embodiment is to achieve insulation between the metal stator core and a plurality of coils formed by being wound around the stator core. The method for insulating the stator core from the coils is coating: therefore, the stator core can be formed with a minimum core thickness. Hence, it is possible to secure a large space for forming a coil as compared with a case in which an insulator is provided, so that the space factor can be increased to enhance the performance of the motor.

Moreover, another feature of the motor of the embodiment is to include a tubular bushing that is fixed to one end side of the stator and through which the shaft is inserted. The bushing is provided with a fixed portion that is fixed to a portion on the one end side of an inner peripheral surface of the stator core, and a guide portion that is extended axially outward of an end surface on the one end side of the stator core from the fixed portion. The motor of the embodiment is provided with the bushing having such a guide portion to enable routing a crossover wire that connects between the plurality of coils in contact with the guide portion of the bushing, which prevents contact (interference) between the shaft located radially inward of the stator core and the crossover wire.

In the following description, directions (an axial direction/axially, a circumferential direction, and a radial direction/radially) of the motor are determined relative to the shaft. The axial direction/axially indicates a direction along the center line of the shaft (a longitudinal direction of the shaft). In the axial direction, a side provided with the bushing relative to the stator is the "one end side," and the opposite side is the "other end side." The circumferential direction indicates a direction around the center line of the shaft (the direction of the circumference), and the radial direction/radially indicates a direction orthogonal to both the axial direction and the circumferential direction.

[1. Configuration]

FIG. 1 is a cross-sectional view taken along the axial direction of a motor 1 according to the embodiment. As illustrated in FIG. 1, the motor 1 includes a rotor 3 that rotates integrally with a shaft 2, a stator 4 placed radially outward of the shaft 2 and radially inward of the rotor 3, and a bushing 5 fixed to the one end side of the stator 4. The motor 1 may be provided with a board (electronic board or control board) 6 on the other end side of the shaft 2. Moreover, the motor 1 may be provided with a holder 7 that holds the board 6, and a metal holder 8 that couples a portion on the other end side of the stator 4 and the holder 7.

The shaft 2 is a rotary shaft that supports the rotor 3, and also functions as an output shaft that takes the output (mechanical energy) of the motor 1 to the outside. A portion, which is on the one end side relative to the rotor 3, of the shaft 2 of the embodiment is rotatably supported by a bearing 21, and the other end portion is rotatably supported by a bearing 22. The bearing 21 on the one end side is fixed to a housing 9, and the bearing 22 on the other end side is fixed to the metal holder 8. Note that the housing 9 is a bottomed tubular component that covers the rotor 3 from radially outside the rotor 3.

The rotor 3 includes a bottomed cylindrical rotor yoke 31, and a magnet 32 fixed to an inner peripheral surface of the rotor yoke 31. The rotor yoke 31 has a shape that has a bottom portion located on the one end side and is open on the other end side. The rotor yoke 31 is mounted with a gap between an outer peripheral surface thereof and an inner peripheral surface of the housing 9. The center of the bottom portion of the rotor yoke 31 is provided with a through-hole in which the inserted shaft 2 is fixed. Consequently, the shaft 2 and the rotor yoke 31 (the rotor 3) rotate integrally. The magnet 32 is fixed to the inner peripheral surface of the rotor yoke 31 at a position away from the bottom portion, and rotates integrally with the rotor yoke 31.

Figure 4:
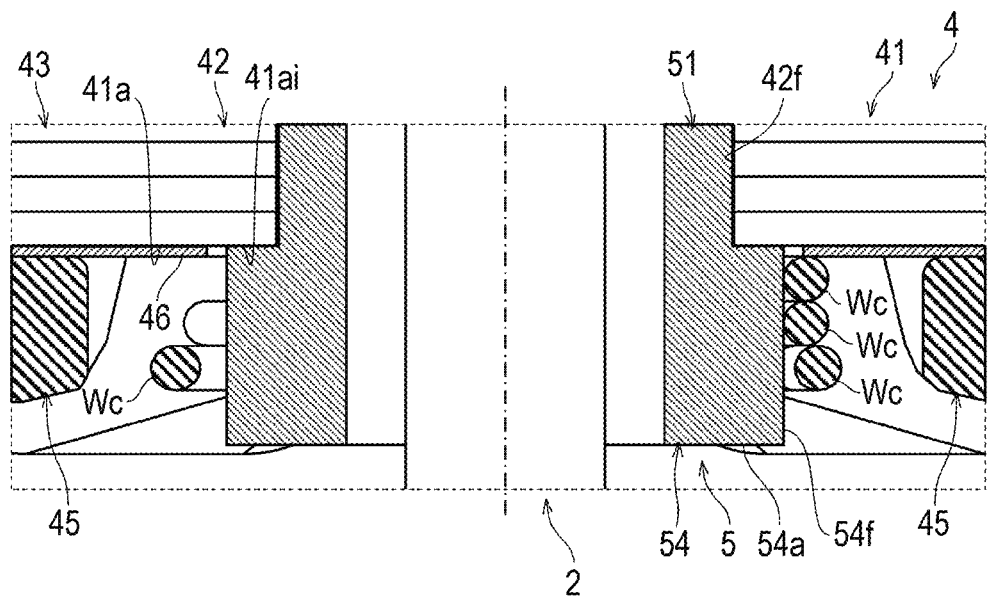
FIG. 4 is an enlarged view of part Y of FIG. 1.

The stator 4 includes a stator core 41, a plurality of coils 45, and an insulating layer 46 (refer to FIG. 4). The stator core 41 is a laminated core obtained by laminating a plurality of steel sheets of the same shape. As illustrated in FIG. 1, the shaft 2 is inserted through the center of the stator core 41 with the axial direction aligned with the steel sheet lamination direction.

Figure 2:
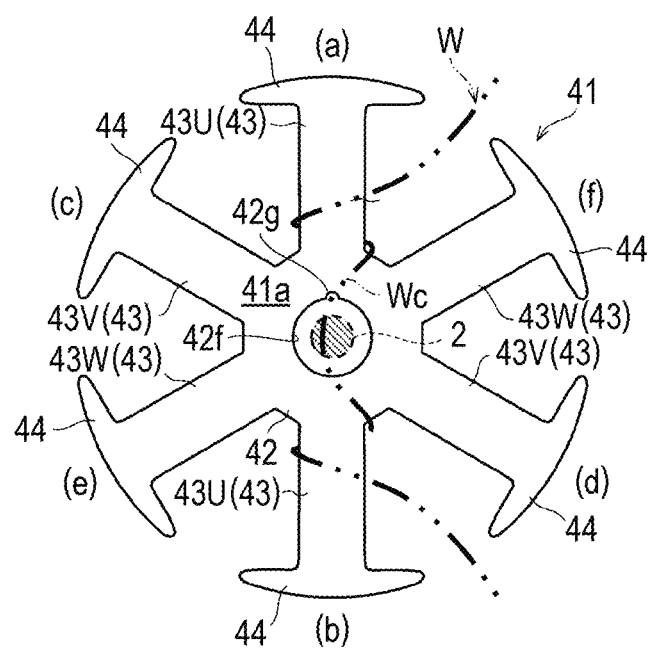
FIG. 2 is a plan view of a stator core of a stator included in the outer rotor brushless motor of FIG. 1 as viewed from one end side.

As illustrated in FIG. 2, the stator core 41 includes a tube portion 42 through which the shaft 2 is inserted, a plurality of tooth portions 43 that protrudes radially outward from the tube portion 42, and blade portions 44 that extend in the circumferential direction at outer end portions of the tooth portions 43, respectively. The stator 4 of the embodiment includes six tooth portions 43 (blade portions 44) spaced equally in the circumferential direction. Note that FIG. 2 is a plan view of the stator core 41 as viewed from the one end side. The cross section of the shaft 2 inserted through the stator core 41 is indicated by a broken line.

The tube portion 42 is a tubular part having an inner peripheral surface 42*f* with an inner diameter greater than the outer diameter of the shaft 2. The inner peripheral surface 42*f* of the tube portion 42 is a cylindrical surface, and an outer peripheral surface of the tube portion 42 may be a cylindrical surface, or a rectangular prism surface. The stator 4 is placed in such a manner that the inner peripheral surface 42*f* does not interfere with the shaft 2. Note that the tube portion 42 may be provided with a positioning groove 42*g* formed by depressing a part of the inner peripheral surface 42*f* along the axial direction. The positioning groove 42*g* is provided to facilitate checking a reference position of the stator 4 in the circumferential direction upon assembly of the motor 1. The blade portions 44 are face portions facing the magnet 32 of the rotor 3, and each form an arc shape as viewed in the axial direction. The tooth portions 43 are parts that connect the tube portion 42 and the blade portions 44, and each form, for example, a rectangular shape as viewed in the axial direction.

Figure 3:
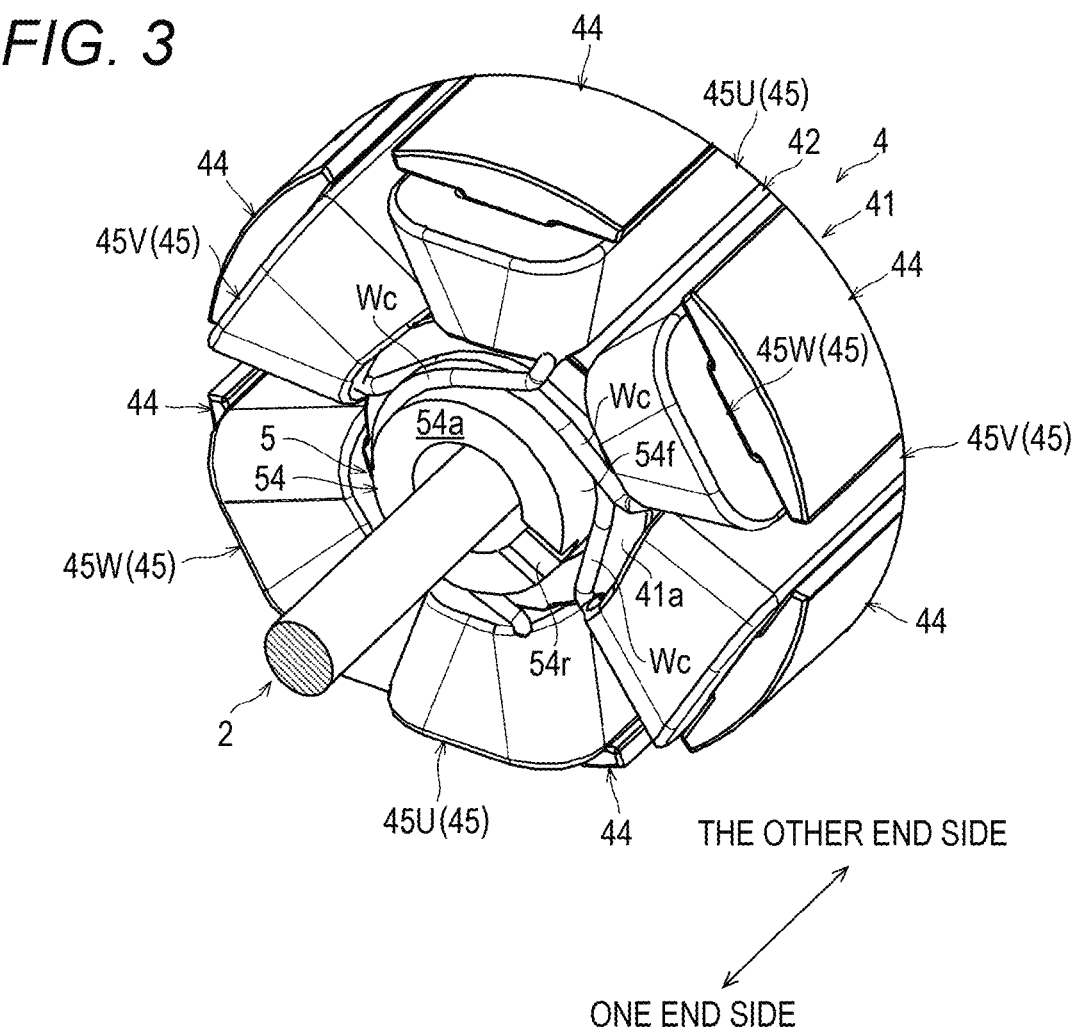
FIG. 3 is an enlarged perspective view of part X of FIG. 1 as viewed from the one end side.

The plurality of coils 45 is formed by a winding W wound around the plurality of tooth portions 43, respectively. In other words, what is formed by winding the winding W around the tooth portion 43 is referred to as the coil 45. As illustrated in FIG. 3, six coils 45 are provided, corresponding to the number of the above tooth portions 43, in the stator 4 of the embodiment.

In the following description, of the six coils 45, two coils 45 facing each other across the shaft 2 are also referred to as a U-phase coils 45U. Moreover, another two coils 45 facing each other across the shaft 2, which are different from the U-phase coils 45U, are also referred to as a V-phase coils 45V. The remaining two coils 45 are also referred to as a W-phase coils 45W. Moreover, the tooth portions 43 that are core materials of the U-phase coils 45U, the V-phase coils 45V, and the W-phase coils 45W are also referred to as a U-phase tooth portions 43U, a V-phase tooth portions 43V, and a W-phase tooth portions 43W, respectively (refer to FIG. 2).

A U-phase current is supplied to the U-phase coils 45U, a V-phase current is supplied to the V-phase coils 45V, and a W-phase current is supplied to the W-phase coils 45W. As illustrated in FIG. 3, each of the same phase pairs of the coils 45U, 45V, and 45W is connected to each other by a crossover wire Wc routed to an end surface 41a on the one end side of the stator core 41. In this manner, the each of the same phase pairs of the coils 45U, 45V, and 45W is continuously wound via the crossover wire Wc to enable efficiently performing a wire connection operation.

As described above, in the stator 4 of the embodiment, the stator core 41 is covered with the insulating coating instead of an insulator. Therefore, insulation between the stator core 41 and the coils 45 is achieved in the stator 4 of the embodiment. The insulating layer 46 is a film formed by applying the insulating coating to the surface of the stator core 41.

The insulating layer 46 is provided to the tooth portions 43 around which the winding W is wound. The insulating layer 46 is provided, for example, all over the tooth portions 43. Moreover, it is preferable that the insulating layer 46 be provided not only to the tooth portions 43 but also to the outer peripheral surface of the tube portion 42 and the end surface 41a to further ensure insulation between the winding W and the stator core 41. In the embodiment, as illustrated in FIG. 4, the insulating layer 46 is provided to the end surface 41a excluding a radially inner portion of the tube portion 42. The radially inner portion is also referred to below as an uncoated portion 41ai. The uncoated portion 41ai is made use of as a portion that holds the stator core 41 upon application of the insulating coating.

The bushing 5 is a tubular component that is fixed to the one end side of the stator 4 and through which the shaft 2 is inserted. As illustrated in FIG. 1, the center line of the bushing 5 agrees with the center line of the shaft 2. A gap is formed between an inner surface of the bushing 5 and an outer peripheral surface of the shaft 2. Note that the bushing 5 of the embodiment has a uniform gap in the axial direction between the inner surface of the bushing 5 of the embodiment and the outer peripheral surface of the shaft 2. However, the bushing 5 is not limited to this as long as the gap can be formed. Moreover, a gap may be formed between the bushing 5 and one end surface of the metal holder 8 located on the other end side.

The bushing 5 has a function of preventing interference between the crossover wires Wc and the shaft 2. As described above, in the stator 4 of the embodiment, the each of the same phase pairs of the coils 45U, 45V, and 45W is connected by the crossover wire Wc. Moreover, the each of the same phase pairs of the coils 45U, 45V, and 45W is placed, facing each other across the shaft 2. Hence, without the bushing 5, the crossover wire Wc of, for example, the U-phase coils 45U may be routed in a path (winding track) passing through the cross section of the shaft 2, as indicated by chain double-dashed lines in FIG. 2. Consequently, the shaft 2 and the crossover wire Wc may contact (interfere with) each other and the crossover wire Wc may break.

As illustrated in FIG. 3, the bushing 5 includes a guide portion 54 that extends axially outward of the end surface 41a of the stator core 41 and guides the crossover wires Wc to prevent such interference between the crossover wires Wc and the shaft 2. Moreover, the bushing 5 includes a fixed portion 51 that is fixed to the inner peripheral surface 42f of the tube portion 42 as illustrated in FIG. 4. The guide portion 54 is a part that is extended axially outward from the fixed portion 51. The fixed portion 51 and the guide portion 54 are integrated by use of, for example, an insulating resin to form the bushing 5.

Figure 5:
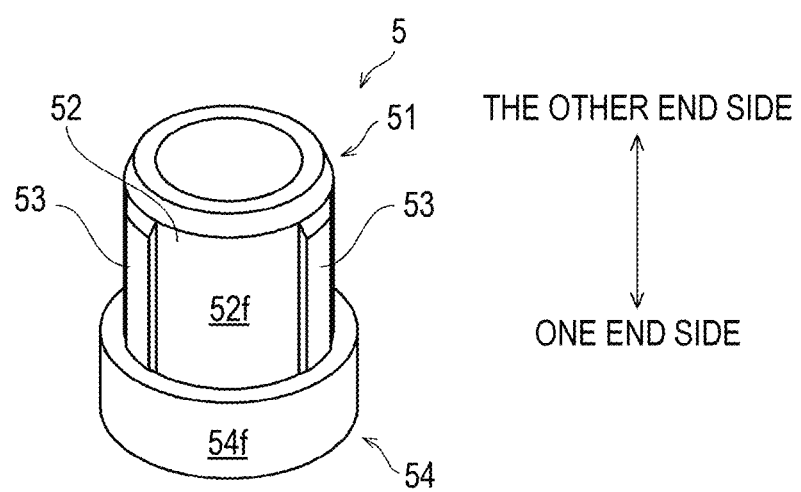
FIG. 5 is a perspective view of a bushing included in the outer rotor brushless motor of FIG. 1 as viewed from the other end side.

As described above, the fixed portion 51 is a part that is fixed to the inner peripheral surface 42f of the tube portion 42, and includes, for example, a cylindrical base portion 52, and a protruding portion 53 that protrudes radially outward from an outer peripheral surface 52f of the base portion 52 as illustrated in FIG. 5. The outer diameter of the outer peripheral surface 52f of the base portion 52 is set to a length at which the outer peripheral surface 52f can be fitted from the inside to the inner peripheral surface 42f (a length slightly less than the outer diameter of the inner peripheral surface 42f). Moreover, the amount of protrusion of the protruding portion 53 relative to the outer peripheral surface 52f is set in such a manner that the outer diameter of the fixed portion 51 including the protruding portion 53 is slightly greater than the inner peripheral surface 42f. Such a fixed portion 51 is inserted onto the inner peripheral surface 42f to press-fit and fix the bushing 5 to the stator 4. Note that in the embodiment, the protruding portion 53 is provided along the entire length of the base portion 52 in the axial direction. However, the protruding portion 53 may be provided to a part of the base portion 52 in the axial direction.

The fixed portion 51 may be provided with a plurality of the protruding portions 53. In the embodiment, three protruding portions 53 are provided to the fixed portion 51. The three protruding portions 53 have the same shape, and are provided, spaced apart from one another in the circumferential direction (in different phases in the circumferential direction). In terms of the protruding portions 53, it is preferable that the adjacent protruding portions 53 be spaced equally in the circumferential direction from the viewpoint of increasing stability upon press-fitting and fixing of the bushing 5.

The guide portion 54 is a part that is extended from the fixed portion 51 toward the one end side, and has, for example, a cylindrical shape. As illustrated in FIG. 4, the guide portion 54 of the embodiment is set in such a manner that its outer diameter is uniform in the axial direction and greater than the inner diameter of the inner peripheral surface 42f. In other words, in terms of the guide portion 54, an outer surface 54f thereof that faces radially outward is located radially outward of the inner peripheral surface 42f of the stator core 41. Put another way, in terms of the bushing 5 of the embodiment, two parts—the fixed portion 51 that is fixed to the inner peripheral surface 42f and the guide portion 54 having the outer surface 54f located radially outward of the inner peripheral surface 42f—form a stepped shape, arranged side by side in the axial direction. Consequently, the position of the bushing 5 relative to the stator core 41 can be determined.

It is more preferable that the outer diameter of the guide portion 54 be set in such a manner that a gap formed between the outer surface 54f and the insulating layer 46 is less than the outer diameter of the winding W (the crossover wire Wc) even if the outer diameter of the guide portion 54 has a size that covers the entire uncoated portion 41ai of the end surface 41a, or a size that covers a part of the uncoated portion 41ai. In this manner, the outer diameter of the guide portion 54 is set to enable routing the crossover wires Wc on the insulating layer 46. To put it differently, it is possible to prevent the crossover wires Wc from coming into contact with the end surface 41a, so that insulation between the winding W and the stator core 41 is achieved more successfully.

If the outer surface 54f of the guide portion 54 is located radially outward of the inner peripheral surface 42f, the positioning groove 42g of the inner peripheral surface 42f is not visible from the one end side as illustrated in FIG. 3. Hence, the guide portion 54 of the embodiment is provided, on an end surface 54a, which faces the one end side, of the guide portion 54 (hereinafter referred to as the "bushing end surface 54a"), with a recessed portion 54r of a recessed shape. Upon insertion of the bushing 5 into the stator core 41, the bushing 5 is inserted into the stator core 41 with the recessed portion 54r in phase with the positioning groove 42g. Therefore, the position of the positioning groove 42g can be indirectly checked via the recessed portion 54r. Note that in the embodiment, the recessed portion 54r is provided in such a manner that the outer shape of the bushing end surface 54a has a C-shape. However, the recessed portion 54r is simply required to be visible at least from the one end side, and the shape of the recessed portion 54r is not limited to the C-shape.

The amount of protrusion of the guide portion 54 from the end surface 41a of the stator core 41 is set to be greater than at least the outer diameter of the crossover wire Wc. As illustrated in FIGS. 3 and 4, a plurality of the crossover wires Wc overlaps one another in the axial direction on the guide portion 54 and can contact the outer surface 54f. Hence, it is preferable that the amount of protrusion of the guide portion 54 be set to be greater than the sum of the outer diameters of the maximum number of (here, three) the crossover wires Wc that are routed, overlapping one another.

The flow of assembly of the motor 1 is described below. Firstly, the bushing 5 is inserted from the one end side onto the inner peripheral surface 42f of the stator core 41 that is covered with the insulating coating and around which the winding W has not been wound (that is, the stator core 41 in the state illustrated in FIG. 2). Consequently, the protruding portions 53 of the fixed portion 51 are pressure welded to the inner peripheral surface 42f, and the bushing 5 is press-fitted and fixed to the stator core 41.

Note that at this point in time, the inner peripheral surface 42f presses the protruding portions 53 radially inward. However, this force is absorbed by the protruding portions 53 expanding and deforming in the circumferential direction. In this manner, in the embodiment, the plurality of the protruding portions 53 is provided, spaced apart from one another in the circumferential direction. Therefore, the expansion and deformation of each of the protruding portions 53 in the circumferential direction are permitted, so that the deformation of the inner hole of the bushing 5 due to press-fitting and fixing can be suppressed. Hence, a space into which the shaft 2 can be inserted can be maintained inside the bushing 5 in the radial direction. Moreover, the protruding portions 53 are spaced equally in the circumferential direction, so that the fixing of the bushing 5 to the stator core 41 can be made more stable.

As illustrated in FIG. 4, in terms of the bushing 5 that has been inserted from the one end side, an end surface, which faces the other end side, of the guide portion 54 comes into contact with the end surface 41a of the stator core 41 to prevent the guide portion 54 from making its way onto the inner peripheral surface 42f and determine the position of the bushing 5. Moreover, as a result, the uncoated portion 41ai is partially covered with the guide portion 54 from the one end side, so that insulation between the winding W to be wound around the stator core 41 in the subsequent process and the stator core 41 is achieved.

Moreover, when the bushing 5 is inserted into the stator core 41, if the bushing 5 is inserted in such a manner that the positioning groove 42g is in phase with the recessed portion 54r, then the reference position of the stator 4 in the circumferential direction can be checked from the one end side as illustrated in FIG. 3 even after the bushing 5 is inserted. Hence, the motor 1 can be smoothly assembled in the subsequent process.

Next, the winding W is wound around the stator core 41 to which the bushing 5 has been fixed to form the coils 45. In the embodiment, the flow of formation of the coils 45 is as follows: one winding W is wrapped around the tooth portions 43U, 43V, and 43W in turn on a phase by phase basis to form the six coils 45, and then the winding W is cut at points where the coils 45U, 45V, and 45W of the different phases are connected. In this manner, one winding W is wound round without being cut (in a unicursal manner), which makes it possible to increase work efficiency.

Specifically, the winding W is wrapped around the tooth portions 43 in the order of (a) to (f) illustrated in FIG. 2. In other words, the winding W is wrapped around one of the two U-phase tooth portions 43U first to form a first U-phase coil 45U [(a) in FIG. 2]. The end wire is then routed as the crossover wire Wc along the outer surface 54f as illustrated in FIG. 3. The winding W is wrapped around the other U-phase tooth portion 43U to form a second U-phase coil 45U [(b) in FIG. 2].

Next, the end wire of the second U-phase coil 45U is routed along the outer surface 54f. The winding W is wrapped around one of the V-phase tooth portion 43V, which is adjacent to the one of the U-phase tooth portions 43U, to form a first V-phase coil 45V [(c) in FIG. 2]. The end wire is then routed as the crossover wire Wc along the outer surface 54f. The winding W is wrapped around the other V-phase tooth portion 43V to form a second V-phase coil 45V [(d) in FIG. 2]. Furthermore, a first W-phase coil 45W and a second W-phase coil 45W are formed in the same manner [(e) and (f) in the same figure]. Lastly, the winding W is cut at points between the second U-phase coil 45U and the first V-phase coil 45V and between the second V-phase coil 45V and the first W-phase coil 45W.

One ends of the coils 45U, 45V, and 45W of each phase are tied into a bundle as a COM line, and the other ends are bundled with an unillustrated bundle pin to be connected to the board 6 and fix the stator 4 to the metal holder 8. Furthermore, the shaft 2 to which the rotor 3 has been fixed is inserted into the inner hole of the bushing 5 from the one end side of the bushing 5 to mount the housing 9. As a result, the assembly of the motor 1 is complete. Note that the assembly procedure of the motor 1 is simply required to fix the bushing 5 to the stator core 41 at least before winding the winding W, and is not limited to the above. For example, the stator 4 may be fixed to the metal holder 8 before the bushing 5 is inserted into the stator core 41 (that is, before the winding W is wound).

[2. Operations, Effects]

(1) In the above-mentioned motor 1, the insulating layer 46 formed by the insulating coating insulates the stator core 41 from the coils 45. In this manner, the method for insulating between the stator core 41 and the coils 45 is the insulating coating instead of the known configuration that provides an insulator. Therefore, large spaces between the adjacent tooth portions 43 can be secured. Hence, the space factor can be increased, so that the performance of the motor 1 can be enhanced. Furthermore, an insulator is not required, so that it is possible to reduce the number of components and simplify the configuration of the motor 1.

In addition, the crossover wires Wc that may interfere with the shaft 2 can be routed in contact with the guide portion 54 of the bushing 5, so that contact (interference) between the shaft 2 and the crossover wires Wc can be prevented. Hence, it is possible to prevent the crossover wires Wc from breaking and enhance the performance of the motor 1.

(2) In the above-mentioned motor 1, the bushing 5 is configured in such a manner that the outer surface 54*f* of the guide portion 54 has the stepped shape located radially outward of the inner peripheral surface 42*f*. Consequently, it is possible to prevent the guide portion 54 from making its way onto the inner peripheral surface 42*f*. Hence, it is possible to further prevent contact between the shaft 2 and the crossover wires Wc and to determine the position of the bushing 5. Moreover, even if there is the uncoated portion 41*ai* that is not covered with the insulating coating, it is also possible to suppress contact between the uncoated portion 41*ai* and the crossover wires Wc due to the guide portion 54, so that insulation performance can be secured.

(3) In the above-mentioned motor 1, the inner peripheral surface 42*f* of the stator core 41 is provided with the positioning groove 42*g*, and the bushing end surface 54*a* is provided with the recessed portion 54*r*. Consequently, upon assembly of the motor 1, the bushing 5 is assembled to the stator core 41 with the positioning groove 42*g* in phase with the recessed portion 54*r*, and therefore, the position of the positioning groove 42*g* can be indirectly checked via the recessed portion 54*r*. Hence, the workability of the assembly operation of the motor 1 can be improved.

(4) In the above-mentioned motor 1, the fixed portion 51 including the base portion 52 and the protruding portions 53 is press-fitted and fixed to the inner peripheral surface 42*f*, and therefore, the bushing 5 is fixed to the stator core 41. In this manner, the bushing 5 is fixed to the stator core 41 by press-fitting. Therefore, the number of man-hours related to the fixing can be reduced. Moreover, the base portion 52 itself is not press-fitted, but the protruding portions 53 are provided to enable suppressing the deformation of the base portion 52 upon press-fitting and fixing. Hence, the space into which the shaft 2 can be inserted can be maintained inside the bushing 5 fixed to the stator core 41 in the radial direction.

(5) In the above-mentioned motor 1, the three protruding portions 53 are provided, spaced apart from one another in the circumferential direction. Consequently, it is possible to make it easier to align the centers upon the insertion of the bushing 5 into the stator core 41. Moreover, the three protruding portion 53 are provided, spaced apart from one another in the circumferential direction. Therefore, the expansion and deformation of the each of the protruding portions 53 in the circumferential direction upon press-fitting are permitted. Hence, the space into which the shaft 2 can be inserted can be maintained inside the bushing 5 fixed to the stator core 41 in the radial direction.

(6) In the above-mentioned motor 1, the stator 4 includes the six tooth portions 43. If the number of the tooth portions 43 is six, the each of the same phase pairs of the coils 45U, 45V, and 45W is placed, facing each other across the shaft 2 as described above. Hence, without the bushing 5, the crossover wires Wc tend to make their way radially inward of the stator core 41. However, in the above-mentioned motor 1, the guide portion 54 inhibits the crossover wires Wc from making their way radially inward, so that interference between the crossover wires Wc and the shaft 2 can be prevented.

[3. Others]

The above-mentioned motor 1 is an example, and is not limited to the above-mentioned configuration. For example, the number of the tooth portions 43 of the stator 4 may not be six. The insulating layer 46 provided to the stator 4 may cover the entire end surface 41*a*. The inner peripheral surface 42*f* may not be provided with the positioning groove 42*g*.

The shape of the bushing 5 is not limited to the above-mentioned shape, either. The guide portion 54 is simply required to be at least one that extends axially outward of the end surface 41*a* from the fixed portion 51 and with which the crossover wires Wc come into contact, and may not have a cylindrical shape. The guide portion 54 may have, for example, a tubular (rectangular tube) shape that forms the outer shape of a polygon as viewed in the axial direction. The outer surface 54*f* of the guide portion 54 may not be located radially outward of the inner peripheral surface 42*f*. In other words, the bushing 5 may not have the stepped shape. If the positioning groove 42*g* is omitted, the recessed portion 54*r* may be omitted.

The fixed portion 51 is simply required to have at least a shape that is fixed to the inner peripheral surface 42*f*, and may not have a tubular shape. The number of the protruding portions 53 provided may be greater than three. If there is no need to align the axial centers of the stator core 41 and the bushing 5 upon fixing the bushing 5 to the stator core 41, the number of the protruding portions 53 may be less than three.

The shape of the protruding portion 53 is not limited to the above-mentioned shape, either. The protruding portion may extend, for example, along the circumferential direction of the base portion 52. At this point, a plurality of the protruding portions may be provided. In this case, as long as the plurality of the protruding portions is provided, spaced apart from one another in the axial direction, the deformation of the protruding portions in the axial direction is permitted upon press-fitting and fixing, so that the deformation of the inner hole of the bushing can be suppressed.

Instead of the fixed portion 51 including the base portion 52 and the protruding portions 53, the fixed portion may have, for example, a tubular (rectangular tube) shape that forms the outer shape of a polygon as viewed in the axial direction. In this case, upon press-fitting and fixing of the bushing 5 to the stator core 41, the corners of the fixed portion are pressure welded to the inner peripheral surface 42*f* and deformed. Therefore, the deformation of the inner hole of the bushing 5 can be suppressed. Moreover, the method for fixing the bushing 5 to the stator 4 may not be press-fitting and fixing, and may be, for example, bonding and fixing.

The invention claimed is:

1. An outer rotor brushless motor comprising:
a rotor configured to rotate integrally with a shaft;
   a stator placed radially outward of the shaft and radially inward of the rotor; and
   a tubular bushing that is fixed to one end side of the stator and through which the shaft is inserted, wherein
   the stator includes:
      a stator core having a tube portion through which the shaft is inserted, and a plurality of tooth portions protruding radially outward from the tube portion;
      a plurality of coils formed by winding a winding around each of the plurality of tooth portions; and
      an insulating layer formed by applying an insulating coating to the tooth portions around which the winding is wound, and
   the tubular bushing includes:
      a fixed portion to be fixed to an inner peripheral surface of the tube portion; and
      a guide portion that extends axially outward of an end surface of the stator core from the fixed portion and with which a crossover wire connecting between the plurality of coils comes into contact.

2. The outer rotor brushless motor according to claim 1, wherein the tubular bushing has a stepped shape in which an outer surface, which faces radially outward, of the guide portion is located radially outward of the inner peripheral surface.

3. The outer rotor brushless motor according to claim 2, wherein
   the inner peripheral surface is provided with a positioning groove extending axially, and
   the guide portion is provided, on a bushing end surface facing in the same direction as the end surface, with a recessed portion of a recessed shape.

4. The outer rotor brushless motor according to claim 1, wherein the fixed portion includes: a cylindrical base portion having an outer peripheral surface with an outer diameter at which the base portion is fittable from the inside to the inner peripheral surface; and a protruding portion protruding from the outer peripheral surface, and is press-fitted and fixed to the inner peripheral surface.

5. The outer rotor brushless motor according to claim 4, wherein
   the fixed portion includes three or more protruding portions, and
   the three or more protruding portions are provided, spaced apart from one another in a circumferential direction.

6. The outer rotor brushless motor according to claim 5, wherein the stator core includes six tooth portions.

7. The outer rotor brushless motor according to claim 4, wherein the stator core includes six tooth portions.

8. The outer rotor brushless motor according to claim 1, wherein the stator core includes six tooth portions.

* * * * *